United States Patent
Draznin et al.

(10) Patent No.: US 11,736,578 B2
(45) Date of Patent: Aug. 22, 2023

(54) MANAGING A SOFTWARE APPLICATION

(71) Applicant: RAKUTEN MOBILE, INC., Tokyo (JP)

(72) Inventors: Sagiv Draznin, Tokyo (JP); John Carse, Tokyo (JP); Sharad Sriwastawa, Tokyo (JP); Tareq Amin, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/543,823

(22) Filed: Dec. 7, 2021

(65) Prior Publication Data

US 2022/0329663 A1    Oct. 13, 2022

Related U.S. Application Data

(60) Provisional application No. 63/173,571, filed on Apr. 12, 2021.

(51) Int. Cl.
*H04L 67/00* (2022.01)
*G06F 8/60* (2018.01)
*G06F 11/36* (2006.01)

(52) U.S. Cl.
CPC ............... *H04L 67/34* (2013.01); *G06F 8/60* (2013.01); *G06F 11/3672* (2013.01)

(58) Field of Classification Search
CPC ......... H04L 67/34; G06F 8/60; G06F 11/3672
See application file for complete search history.

(56) References Cited

U.S. PATENT DOCUMENTS 9,781,016 B1 * 10/2017 Marquardt .......... H04L 41/5054
10,108,442 B1 * 10/2018 Camarda Silva Folco ..................
                                                G06F 9/45516
(Continued)

FOREIGN PATENT DOCUMENTS

EP          3955530  A1 *  2/2022   ......... G06F 9/45558
KR       102462412  B1 * 11/2022

(Continued)

OTHER PUBLICATIONS

International Search Report dated Mar. 1, 2022 from the International Searching Authority in International Application No. PCT/US2021/063036.

(Continued)

*Primary Examiner* — Shean Tokuta
(74) *Attorney, Agent, or Firm* — Sughrue Mion, PLLC (57) ABSTRACT

A server of a mobile network operator (MNO) executes network control logic for unbundling vertically integrated software on specialized hardware equipment, referred to here as a host. For example, the server performs a handshake with the host, and establishes an encrypted channel. The server then negotiates with the host, and determines those interfaces that the host will expose to third party software. The server, based on a current need of the MNO for a network service, compares the negotiation results with contents of a smart library. If the smart library does not have a registered and suitable app for the network service, the server obtains metadata corresponding to the app from a software supplier. The server then, for example, tests the metadata on a mockup of the host, under the control of the server. The host eventually runs the app, providing the network service without requiring an entire software revision of the host.

20 Claims, 11 Drawing Sheets

(56) References Cited

U.S. PATENT DOCUMENTS

| | | | |
|---|---|---|---|
| 10,282,193 B1* | 5/2019 | Lanner | H04L 67/34 |
| 10,491,603 B1* | 11/2019 | Robinson | H04L 63/20 |
| 10,496,386 B1* | 12/2019 | Ho | G06F 9/45508 |
| 10,735,319 B1* | 8/2020 | Stevens | H04L 47/788 |
| 11,323,325 B1* | 5/2022 | Hullahalli | H04L 41/0883 |
| 11,397,594 B1* | 7/2022 | David | G06F 9/44526 |
| 11,411,833 B1* | 8/2022 | Subramanian | H04L 41/145 |
| 11,463,314 B2* | 10/2022 | Pieczul | H04L 41/0816 |
| 2005/0177755 A1 | 8/2005 | Fung | |
| 2007/0281673 A1 | 12/2007 | Comp | |
| 2011/0093847 A1* | 4/2011 | Shah | G06F 9/45558 718/1 |
| 2013/0132395 A1* | 5/2013 | Gupta | G06Q 30/0251 707/E17.058 |
| 2014/0364970 A1* | 12/2014 | Goli | G05B 19/042 700/86 |
| 2015/0135164 A1* | 5/2015 | Bright | G06F 11/3672 717/124 |
| 2015/0319043 A1* | 11/2015 | Dibirdi | H04L 41/0886 370/254 |
| 2017/0149931 A1* | 5/2017 | Lochhead | H04L 41/5009 |
| 2017/0289060 A1* | 10/2017 | Aftab | H04L 41/5054 |
| 2017/0353530 A1* | 12/2017 | Crawford | H04L 67/34 |
| 2018/0088922 A1* | 3/2018 | Cook | H04L 67/34 |
| 2018/0145955 A1* | 5/2018 | Nirwal | H04L 63/068 |
| 2018/0239802 A1* | 8/2018 | Fabijancic | G06F 11/3664 |
| 2018/0276287 A1* | 9/2018 | Kurian | G06F 8/60 |
| 2018/0357080 A1* | 12/2018 | Kown | G06F 9/44526 |
| 2019/0104442 A1* | 4/2019 | Witzel | H04W 36/0072 |
| 2020/0125352 A1* | 4/2020 | Kannan | G06F 8/65 |
| 2020/0279001 A1* | 9/2020 | Prabhugaonkar | G06F 40/295 |
| 2020/0394120 A1 | 12/2020 | Fathi Salmi et al. | |
| 2020/0412837 A1* | 12/2020 | Sodagar | G06F 9/547 |
| 2021/0026700 A1* | 1/2021 | Manickam | G06F 9/5055 |
| 2021/0029218 A1* | 1/2021 | Huang | H04L 43/0852 |
| 2021/0227046 A1* | 7/2021 | Su | H04L 12/1403 |
| 2021/0233045 A1* | 7/2021 | Singh | G06Q 20/12 |
| 2021/0368427 A1* | 11/2021 | Rommer | H04W 76/00 |
| 2021/0409931 A1* | 12/2021 | Arkko | H04L 41/5054 |
| 2022/0019446 A1* | 1/2022 | Maloney | G06F 8/65 |
| 2022/0030413 A1* | 1/2022 | Ben Henda | H04L 61/4511 |
| 2022/0272005 A1* | 8/2022 | Pandian | H04L 61/2514 |
| 2022/0286891 A1* | 9/2022 | Zhu | H04W 28/0215 |
| 2022/0301699 A1* | 9/2022 | Crockett | G06Q 10/1095 |
| 2022/0303331 A1* | 9/2022 | Svennebring | H04N 21/8456 |
| 2022/0327044 A1* | 10/2022 | Draznin | G06F 9/44526 |
| 2022/0329663 A1* | 10/2022 | Draznin | H04L 67/10 |
| 2022/0343417 A1* | 10/2022 | Sambhar | G06Q 30/0629 |
| 2022/0413935 A1* | 12/2022 | Kantamneni | G06F 9/5077 |

FOREIGN PATENT DOCUMENTS

| | | | | |
|---|---|---|---|---|
| WO | WO-2015189380 A1 * | 12/2015 | | H04M 3/436 |
| WO | WO-2017168205 A1 * | 10/2017 | | G06F 9/45558 |
| WO | WO-2017176877 A1 * | 10/2017 | | G06F 9/45558 |
| WO | WO-2020231952 A1 * | 11/2020 | | G06F 8/63 |

OTHER PUBLICATIONS

Written Opinion dated Mar. 1, 2022 from the International Searching Authority in International Application No. PCT/US2021/063036.

* cited by examiner

MANAGING A SOFTWARE APPLICATION

FIELD

Embodiments relate to generating and managing a software application ("app").

BACKGROUND

Network Function Virtualization (NFV) allows network services to be run as a software module on a general purpose server rather than specialized hardware equipment. An example of such a software module is a Virtual Network Function (VNF). Some network services, such as wireless, cannot be run from a general purpose server. Specialized hardware equipment is needed for multiple access wireless systems such as 5G.

Example vendors of specialized hardware equipment are Nokia, Corporation of Espoo, Finland and Telefonaktiebolaget LM Ericsson of Stockholm, Sweden.

Specialized hardware equipment may be deployed, owned and operated by a traditional infrastructure equipment owner such as Verizon of New York, N.Y.

Examples of software modules are firewalls, load balancers and gateways.

Examples of cloud services accessed by software modules are network slices, backup equipment, network interfaces, processing resources and memory resources.

As used herein, an interface is a point of interaction between two network entities. The interface may be a software application programming interface (API). In some cases, an interface is a network protocol.

An app is a piece of software that utilizes underlying services to perform a function. The app may pass parameters in the form of arguments to an underlying service.

SUMMARY

The specialized hardware equipment is difficult for an operator to use when a new problem arises. New software versions from a vendor of the specialized hardware equipment take a long time to deploy and are expensive. A solution is needed by which a new problem can be addressed with a patch to an operating software configuration of the specialized hardware equipment. Provided herein are smart libraries. The smart libraries store software modules, called apps, which can be deployed to specialized hardware equipment to solve a new problem.

Examples of new problems are a CPU of the specialized hardware equipment running hot (a utilization rate higher than recommended) or log files being required by an operator of the specialized hardware equipment or log files being required by an end-user of a wireless system.

Electrical energy consumption in wireless systems is very high. As part of operating a responsible network, reducing electrical energy consumption is needed.

Data flow in wireless networks is very high. Operators and end users are expected to require additional log files related to these data flows. Providing these log files is a network service.

Embodiments provided herein obtain an app from a software supplier and run the app on a host. The host is an example of a specialized hardware equipment. As a result of running the app, a network service is provided. In some embodiments, the network service includes improved network performance (such as reduction of electrical energy consumption by the host).

A server of a mobile network operator (MNO) executes network control logic for unbundling vertically integrated software on specialized hardware equipment, referred to here as a host. The server performs a handshake with the host, and establishes an encrypted channel.

The server then negotiates with the host, and determines those interfaces, if any, that the host is willing to expose to third party software. The server, based on a current need of the MNO for a network service, compares the negotiation results with contents of a smart library. If the smart library does not have a registered and suitable app for the network service, the server obtains metadata corresponding to the app from a software supplier. The server then tests the metadata on a mockup of the host, under the control of the server. If the metadata is satisfactory, the server commands the smart library to obtain the app from the software supplier, and commands the host to install the app (obtained from the software supplier). The host then runs the app, providing the network service without requiring an entire software revision of the host. When the server determines that the app should be removed from the host, it sends a command to the host.

Provided herein is a method of managing a software application by a network control logic entity, the method comprising: obtaining an app; and running the app on a host server, wherein the host server is configured to provide services on a network, wherein the running the app provides a first network service, the host server is provided by an infrastructure vendor, the app is requested by the network control logic entity from a smart library server, and the smart library server is not under a control of the infrastructure vendor.

In some embodiments, the method includes requesting, by the network control logic entity from a software supplier, the app, wherein the app is to be configured to perform a first feature not available in the network.

In some embodiments, the method includes the network control logic entity commanding the host server to install the app in the host server.

In some embodiments, the app is configured to invoke cloud services via an application programming interface (API), wherein the cloud services and the API are supported by a cloud.

In some embodiments, a user makes use of the first network service provided by the host server executing the app.

In some embodiments, the first network service provides a log of phone calls made by the user.

In some embodiments, the first network service provides a reduction in electrical power consumption of the host server.

In some embodiments, the obtaining further comprises: testing, by the network control logic, metadata on a mock-up of the host server, wherein the metadata corresponds to the app and characterizes the app, at least in part, in terms of codelets.

In some embodiments, the obtaining further comprises: determining by the smart library server, that the app is present in a smart library database (DB); and notifying the network control logic entity that the app is available in the DB.

In some embodiments, a first image of the app occupies a first memory region of a first server controlled by a software supplier, a second image of the app occupies a second memory region of the DB of the smart library server, and a third image of the app occupies a third memory region of the host server.

In some embodiments, the network control logic entity commands the host server to de-install the app from the host server and to save an app state in a fourth memory region of the DB, whereby the host server no longer provides the first network service.

Also provided herein is an apparatus, the apparatus comprising: one or more processors; one or more memories; and computer code, wherein the computer code comprises: obtaining code configured to obtain an app; and executing code configured to cause the app to run on a host server, wherein: the host server is configured to provide services on a network, the app is configured to provide a first network service, the host server is provided by an infrastructure vendor, the app is requested by a network control logic entity from a smart library server, and the smart library server is not under a control of the infrastructure vendor.

In some embodiments of the apparatus, the obtaining further comprises: testing, by the network control logic, metadata on a mock-up of the host server, wherein the metadata corresponds to the app and characterizes the app, at least in part, in terms of codelets.

Also provided herein is a non-transitory computer readable medium storing instructions, wherein the instructions are configured to cause a computer to: obtain an app; and run the app on a host server, wherein the host server is configured to provide services on a network, wherein the app is configured to provide a first network service, the host server is provided by an infrastructure vendor, the app is requested by a network control logic entity from a smart library server, and the smart library server is not under a control of the infrastructure vendor.

Further, with respect to generating a software application provided herein is a method of generating an app by a network control logic entity, the method comprising: identifying requirements for operation of the app on a host server; sending the requirements to a software supplier; receiving the app at the network control logic entity; testing the app; and registering the app with a smart library server, wherein the host server is configured to provide services on a network, the app is configured to provide a first network service on the network, the host server is provided by an infrastructure vendor, and the smart library server is not under a control of the infrastructure vendor.

In some embodiments of the method the method includes negotiating by asking a host server what application programming interfaces (APIs) it is willing to expose; and identifying a network service which is needed and can be realized through one of the APIs.

In some embodiments, the testing the app includes testing the app for compatibility with the host server.

In some embodiments, the testing the app includes testing the app for achievement of a first feature, whereby a first service is provided by the host server on the network.

In some embodiments, the testing the app includes an application programming interface (API) for invocation of cloud services, wherein the cloud services and the API are supported by a cloud.

In some embodiments, the app is configured to permit a user to make use of the first network service provided by the host server executing the app.

In some embodiments, the first network service provides a log of phone calls made by the user.

In some embodiments, the first network service provides a reduction in electrical power consumption of the host server.

In some embodiments, a first image of the app occupies a first memory region of a first server controlled by the software supplier, a second image of the app occupies a second memory region of a database (DB) of the smart library server, and a third image of the app occupies a third memory region of the host server.

In some embodiments, the testing further comprises: testing, by the network control logic, metadata on a mock-up of the host server, wherein the metadata corresponds to the app and characterizes the app, at least in part, in terms of codelets.

DETAILED DESCRIPTION

Figure 1A:
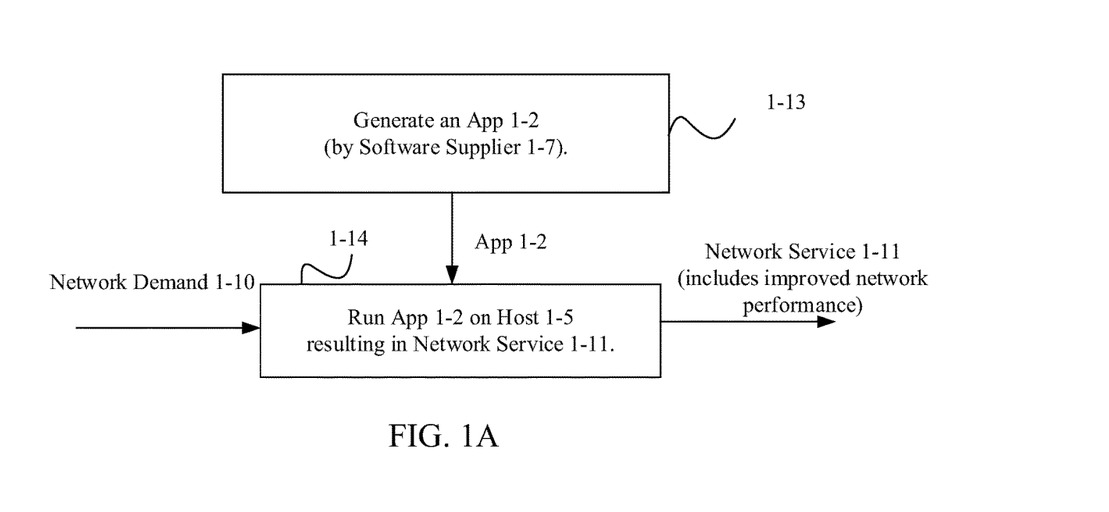
FIG. 1A is a logic flow for managing a software application, according to some embodiments.

FIG. 1A is a logic flow for managing a software application. At 1-13, an app 1-2 is generated by a software supplier 1-7. The app 1-2 may be stored in an App database (DB) 4-1 of a smart library 1-1 (not shown). At 1-14, a network demand 1-10 of a network 1-4 is observed and the app 1-2 is obtained from the smart library 1-1. The app 1-2 is run at 1-14 on a host 1-5, resulting in network service 1-11. The host 1-5 may operate on a cloud 1-9 (not shown). The network service 1-11 may include improved network performance of the network 1-4. The improved network performance includes, in some embodiments, reducing energy consumption of the host 1-5 or reduction in the software footprint of the host 1-5.

In these ways, at FIG. 1A item 1-14, the ability to deploy app 1-2 without a complete software change at host 1-5 can reduce the operating expenses (OPEX) of the operator. Also, an ability to deploy host 1-5 without every conceivable software feature can reduce capital expenses (CAPEX) related to host 1-5 and reduce costs which must be recovered by a lessor (traditional infrastructure equipment owner) from a lessee (operator who owns less than all of the infrastructure equipment, or possibly owns none of the infrastructure equipment), thus benefiting the operator.

A technical effect is that software requirements of the host 1-5 are reduced at a time of deployment of host 1-5, and this permits more efficient generation of software as needed when new problems arise. More efficient generation of software leads to software occupying a smaller code space and requiring less run time. These are technical improvements to the functioning of a computer.

Figure 1B:
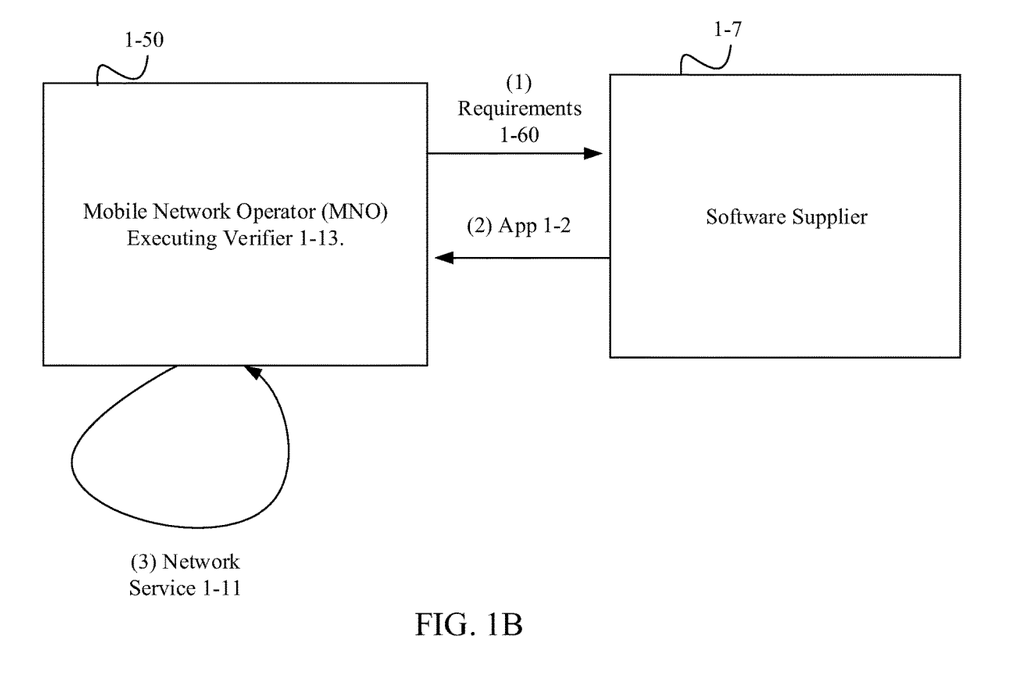
FIG. 1B is a system diagram for generating a software application, according to some embodiments.

FIG. 1B illustrates a mobile network operator (MNO) 1-50 in communication with the software supplier 1-7. The MNO 1-50 first sends software requirements 1-60 to the software supplier 1-7. The software supplier 1-7 then sends the app 1-2 to the MNO 1-50. The MNO 1-50 then runs the app 1-2 on the host 1-5 and thereby provides network service 1-11.

Figure 2:
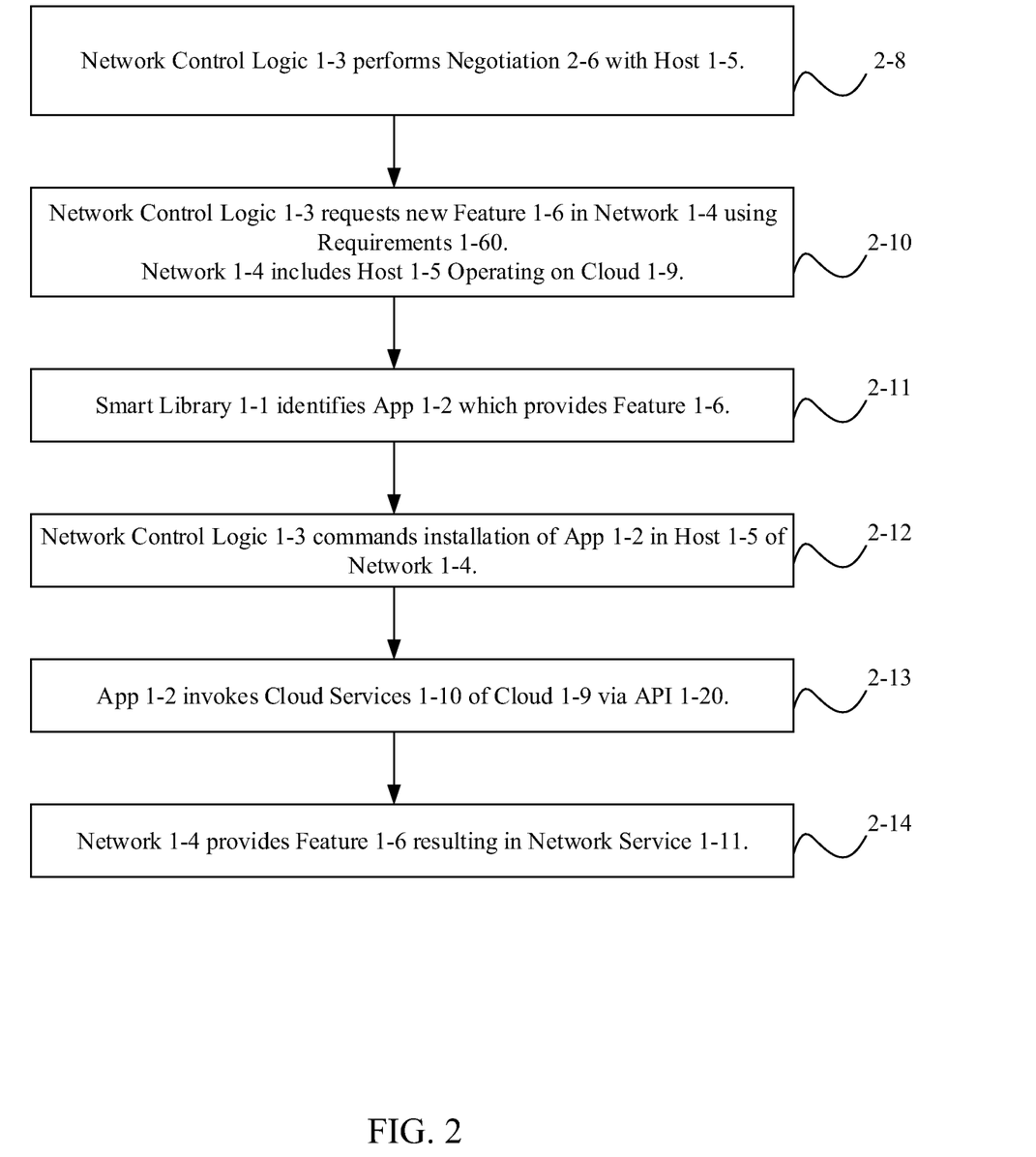
FIG. 2 provides additional logic to the logic flow of FIG. 1A, according to some embodiments.

FIG. 2 provides additional description related to the logic of FIGS. 1A and 1B. At 2-8, network control logic 1-3 performs a negotiation 2-6 with the host 1-5. The negotiation 2-6 is described in more detail below with respect to FIG. 3A. At 2-10, network control logic 1-3 requests a new feature 1-6 in the network 1-4. An example of network control logic 1-3 is the configuration, control and management performed by an operator of a wireless network, for example, MNO 1-50 of FIG. 1B. In some embodiments, the MNO 1-50 may access, under a contract arrangement, the host 1-5 and cloud 1-9 provided by third parties. For example, the MNO 1-50 may be a lessee of the host 1-5 and portions of the cloud 1-9, wherein a third party is a lessor of the host 1-5 and/or of a portion of the cloud 1-9 to the MNO 1-50.

An example of a new feature 1-6 is an energy saving feature, a log feature, a firewall feature, a load balancer feature or a gateway feature. Corresponding examples of network service 1-11 are reduced electrical energy consumption in the network 1-4, improved provision of logs to the MNO 1-50 or end-user of the network 1-4, protection of the network 1-4 from malicious computer attack, improved load balancing for the host 1-5 and another specialized hardware equipment on the network 1-4 and access to devices with one or more new protocols in the stacks they support (gateway). Thus the network 1-4 is improved by the ability to get the feature 1-6 from the smart library 1-1.

For example, an energy saving feature may turn off cooling fans based on temperature constraints being satisfied. For example, if an internal temperature of the host is above a first threshold but below a second, higher, threshold, the energy saving feature may command that one of two cooling fans be turned off.

At 2-11, the smart library 1-1 identifies app 1-2 which provides feature 1-6.

At 2-12, the network control logic 1-3 commands installation of the app 1-2 in host 1-5.

The app 1-2 begins to function. At 2-13, app 1-2 invokes cloud services 1-10 of cloud 1-9 via an API 1-20. Examples of cloud service 1-10 are network slices, backup equipment, network interfaces, processing resources and memory resources.

At 2-14, based on the execution of app 1-2 on host 1-4, network control logic 1-3 has provided network 1-4 with feature 1-6 resulting in network service 1-11.

Figure 3A:
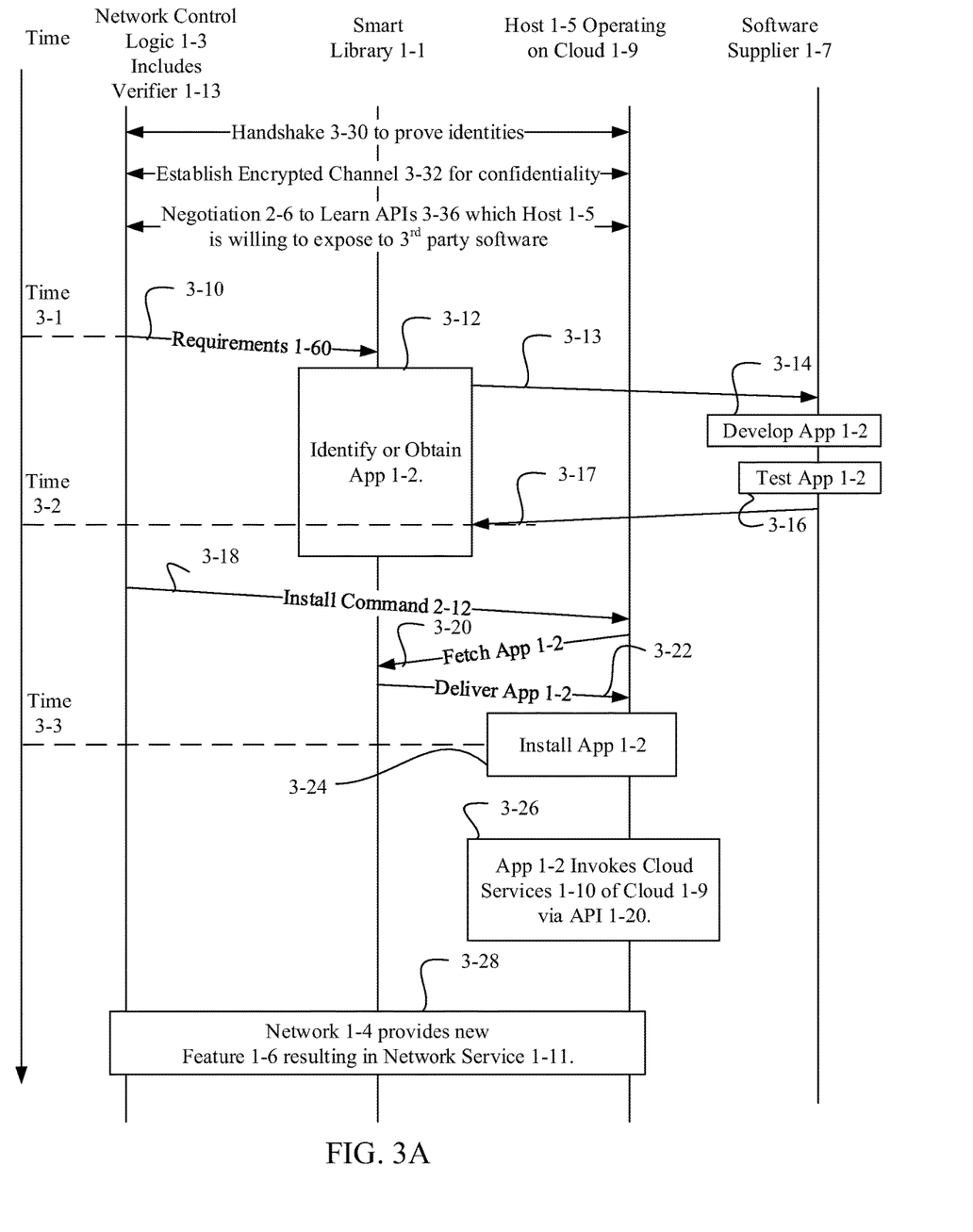
FIG. 3A is a message bounce diagram corresponding to the logic flow of FIG. 2, according to some embodiments.

FIG. 3A is a message bounce diagram corresponding to the logic flow of FIG. 2, according to some embodiments. Time is shown advancing from top to bottom; see a time axis at the left of FIG. 3A. Network control logic 1-3, which in some embodiments includes a verifier 1-13, performs a handshake 3-30 with host 1-5 so that each side can prove the identity of the other party. This may be performed using, for example, public key infrastructure (PKI) techniques.

Generally, the verifier 1-13 is configured to perform the following functions. For further details, see FIGS. 2, 3A, 3B, 9 and 10.

Perform a handshake 3-30 with the host 1-5 to prove the verifiers identity and to test the identity of the host for authenticity, Establish an encrypted channel 3-32 with a host for confidentiality, Perform a negotiation 2-6 with the host 1-5 to identify APIs 3-36 which the host 1-5 is willing to expose to $3^{rd}$ party software, Perform a test 9-13 of an app, or stipulate performance of tests 9-15 and 9-18 by the test service 9-1, Maintain a table of specialized hardware equipment by vendor name and model number (the table including configuration information of the model, such as number of CPUs including CPUs running real-time kernels, air interfaces supported by the host, such as LTE, 5G, NR, Wi-Fi and BlueTooth), code size, available free memory for new software, amount of memory, interface capability, number of cooling fans, log file capability, firewall features and load sharing capability, and An internal interface with the network control logic 1-3, in order to recognize when a feature is needed to be performed by the host 1-5, and when the feature should be removed from the host 1-5.

The verifier 1-13 may be implemented in software running on a CPU in a server or in customized hardware such as FPGAs and/or ASICs.

After proving identities, a secure channel may be set up, referred to as an encrypted channel 3-32 in FIG. 3A. The encrypted channel 3-32 ensures that communications between the network control logic 1-3 and the host 1-5 cannot be obtained by a malicious third party.

Next, the network control logic 1-3 performs a negotiation 2-6 with the host 1-5. The purpose of the negotiation 2-6 is to learn aspects of the host 1-5 that the host 1-5 is willing to allow the network control logic 1-3 to control and/or to observe. Examples of aspects which might be exposed are energy control, energy saving, logging of events, a firewall or load balancing. This negotiation 2-6 illustrates presence of mutual trust or absence of mutual trust for various functions of the host 1-5. In an example, the host 1-5 informs the network control logic 1-3 of APIs 3-36 which the host 1-5 is willing to expose to interfacing with third party software.

At 3-10, the requirements 1-60, in view of the negotiation 2-6 and APIs 3-36, are sent from network control logic 1-3 to smart library 1-1. The requirements 1-60 may be considered a feature request. Also see FIG. 2, item 2-10. At time 3-1, smart library 1-1 identifies or obtains app 1-2 (marked as item 3-12). If an app meeting the requirements 1-60 is registered in a database (DB) 4-1 of the smart library 1-1 (see FIG. 4A), then the network logic 1-3 can immediately begin making use of the app.

In some embodiments, smart library 1-1 obtains the app 1-2 from a software supplier 1-7 as shown by the arrow 3-13. In the case of obtaining from the software supplier 1-7, the software supplier 1-7 develops the app 1-2 as shown with item 3-14 and tests the app 1-2 as shown with item 3-16. The software supplier 1-7 then provides the app 1-2 as shown by item 3-17 at a time 3-2. The smart library 1-1 then communicates with the network control logic 1-3 (not shown).

At 3-18, the network control logic 1-3 issues an install command 2-12 to the host 1-5. In some embodiments, the host 1-5 performs a download operation from the smart library 1-1 (shown as item 3-20 and 3-22).

At time 3-3, the host 1-5 then installs the app 1-2.

At 3-26, the app 1-2 invokes cloud services 1-10 of cloud 1-9 via an API 1-20. In some embodiments, the API 1-20 is not used, and the cloud services 1-10 are invoked via a protocol, for example, with an end point of the protocol being a remote server available in cloud 1-9.

At 3-28, network 1-4 provides feature 1-6 resulting in network service 1-11. See the discussion of feature 1-6 and network service 1-11 above in the description of FIG. 2.

Figure 3B:
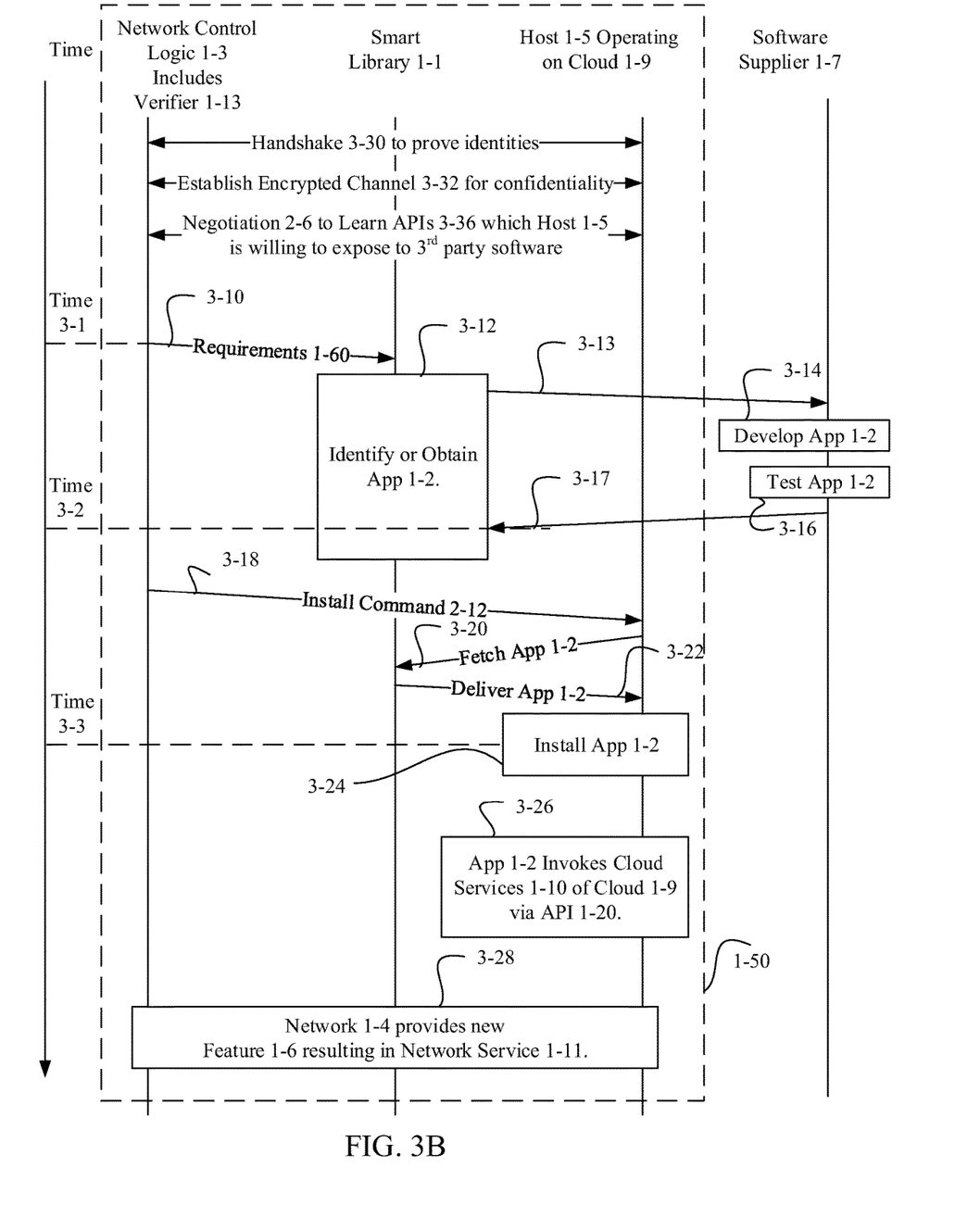
FIG. 3B is a message bounce diagram illustrating a variation of FIG. 3A, according to some embodiments.

FIG. 3B provides an additional embodiment with respect to FIG. 3A. In FIG. 3B, the MNO 1-50 includes the smart library 1-1 and the host 1-5. For example, the MNO 1-50 may own, possess and/or have some control over each of the network control logic 1-3, smart library 1-1 and host 1-5, in some embodiments. Similarly the processing entities 5-1, 5-2 and 5-4 may be owned or controlled by the MNO 1-50 (see FIG. 5). Aspects which are otherwise the same from FIG. 3A are not repeated in the description of FIG. 3B.

Figure 4A:
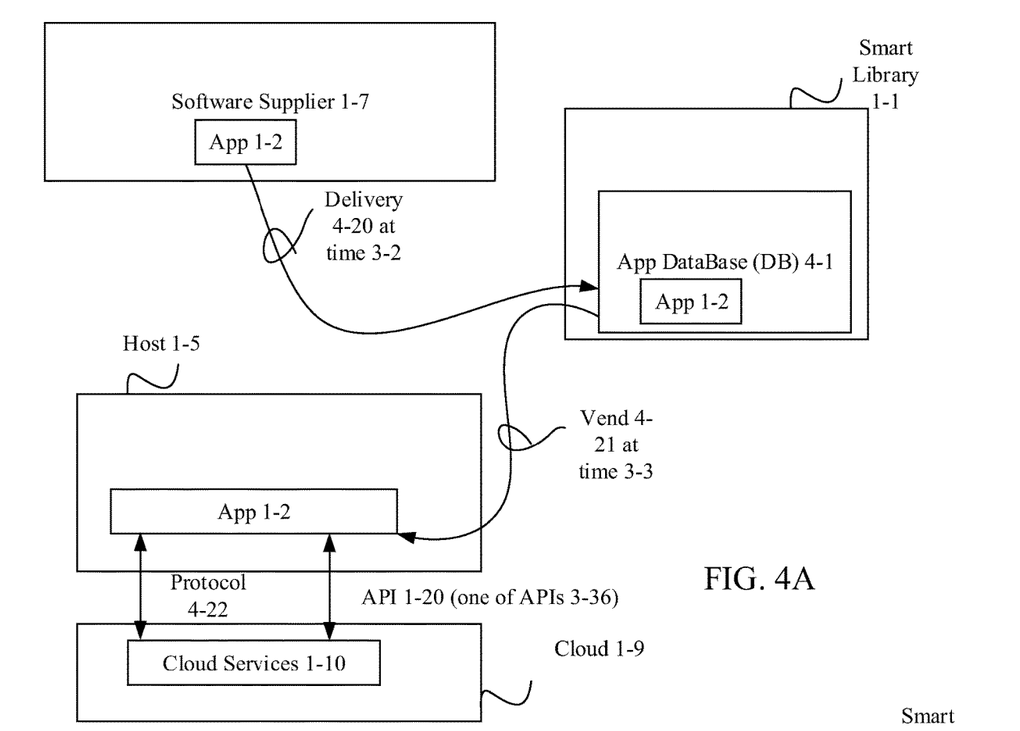
FIG. 4A is a system diagram illustrating interactions of various apparatuses with respect to installation of a software app, according to some embodiments.

FIG. 4A is a system diagram illustrating interactions of various apparatuses with respect to installation of the app 1-2, according to some embodiments. The software supplier 1-7, after development of the app 1-2, possesses an image of the app 1-2 in the sense of computer software such as a binary file, for example. Corresponding to FIGS. 3A and 3B, the app 1-2 is delivered to the smart library 1-1 at time 3-2 and stored as an image in the App DB 4-1. Also corresponding to FIGS. 3A and 3B, at time 3-3 the app 1-2 is downloaded to the host 1-5 in a vend operation 4-21. An image of the app 1-2 then exists on the host 1-5. The app 1-2 the achieves feature 1-6 delivering network service 1-11 by using API 1-20 with cloud services 1-10 available from cloud 1-9. An alternative communication arrangement is shown with the app 1-2 accessing cloud services 1-10 via a protocol 4-22 communicating with a remote server available in cloud 1-9 (remote server not shown). Also see FIGS. 3A and 3B item 3-26. The protocol 4-22 may include one or more TCP/IP applications or layers.

Figure 4B:
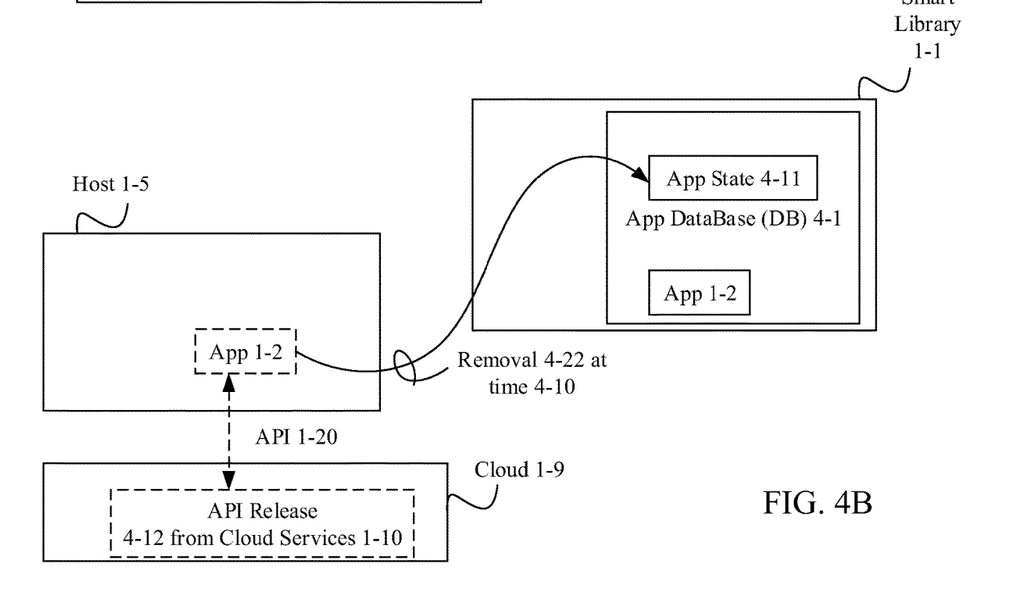
FIG. 4B is a system diagram illustrating removal of a software app, according to some embodiments.

FIG. 4B is a system diagram illustrating removal of app 1-2, according to some embodiments. At a time 4-10, which for example, occurs after the performance of feature 1-6 using cloud services 1-10 shown in FIG. 4A, the network control logic 1-3 issues a command to the host 1-5 to remove the app 1-2, release the API 1-20 (and/or tear down the protocol 4-22), and save an app state 4-11 to the App DB 4-1. App state 4-11 includes parameters related to the performance of the app 1-2, such as memory usage, operation time, and version number.

Figure 5:
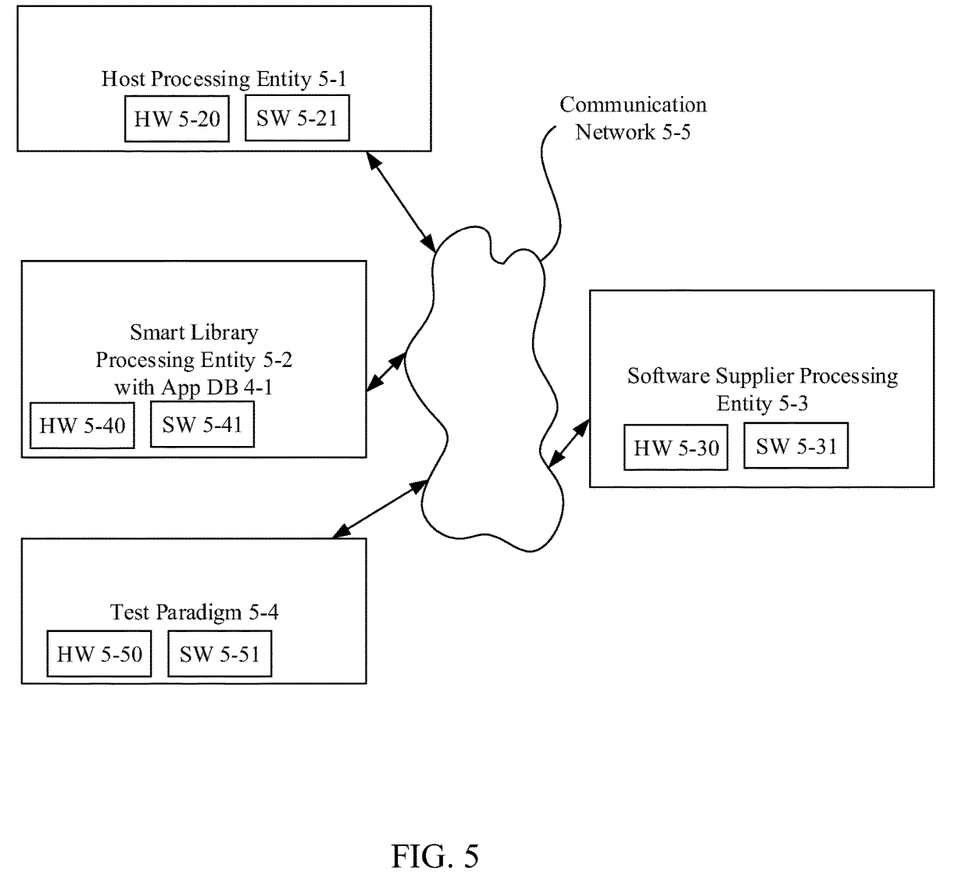
FIG. 5 is a system diagram illustrating network connectivity, hardware and software of the various apparatuses, according to some embodiments.

FIG. 5 is a system diagram illustrating network connectivity, hardware and software of the various apparatuses, according to some embodiments. Also see FIG. 11. Host processing entity 5-1 includes hardware 5-20 such as CPUs and memory and software 5-21 such as operating system, applications, vendor-specific software, protocol stacks and interface software. Host processing entity 5-1 is configured to communicate over a communication network 5-5 using well known protocols at various layers and with various features and capabilities such as TCP/IP, TLS, FTP, SSH, and IPsec, for example. Host processing entity 5-1 is an example of host 1-5, in some embodiments.

Smart library processing entity 5-2 includes App DB 4-1, hardware 5-40 such as CPUs and memory and software 5-41 such as operating system, applications, vendor-specific software, protocol stacks and interface software. App DB 4-1 is in general composed of both software and hardware elements. Smart library processing entity 5-2 is configured to communicate over a communication network 5-5 using well known protocols such as TCP/IP, TLS, FTP, SSH, and IPsec, for example. Smart library processing entity 5-1 is an example of an instantiation of smart library 1-1, for example.

Software supplier processing entity 5-3 includes hardware 5-30 such as CPUs and memory and software 5-31 such as operating system, applications, vendor-specific software, protocol stacks and interface software. A database may also be deployed in 5-3 (not shown). Software supplier processing entity 5-3 is configured to communicate over a communication network 5-5 using well known protocols such as TCP/IP, TLS, FTP, SSH, and IPsec, for example. Software supplier processing entity 5-3 is an example a software development environment deployed by software supplier 1-7, for example.

Test paradigm 5-4 makes use of hardware 5-50 such as CPUs and memory and software 5-51 such as operating system, applications, vendor-specific software, protocol stacks and interface software. A database may also be deployed with 5-4 (not shown). The test paradigm 5-4 is configured to communicate over a communication network 5-5 using well known protocols such as TCP/IP, TLS, FTP, SSH, and IPsec, for example. Test paradigm 5-4 may be implemented by a vendor of specialized hardware equipment, a traditional infrastructure equipment owner, a third party testing laboratory, the software supplier 1-7 or the network control logic 1-3.

The test paradigm 5-4 may use benchmark tests for performance of the host 1-5 to see that app 1-2 does not affect other operations of host 1-5 in a negative way. For example, if app 1-2 arrives at a software state it cannot escape and occupies significant CPU time of host 1-5, this would be a failure of app 1-2. The test paradigm 5-4 also evaluates the performance of app 1-2 in delivering feature 1-6 in terms of, for example, execution time, electrical energy consumption (power in Watts), the aspects of feature 1-6 visible to the MNO 1-50 or to an end user (for example delivery of logs without errors in a readable form in a timely manner). Also see item 10-13 of FIG. 10.

Figure 6:
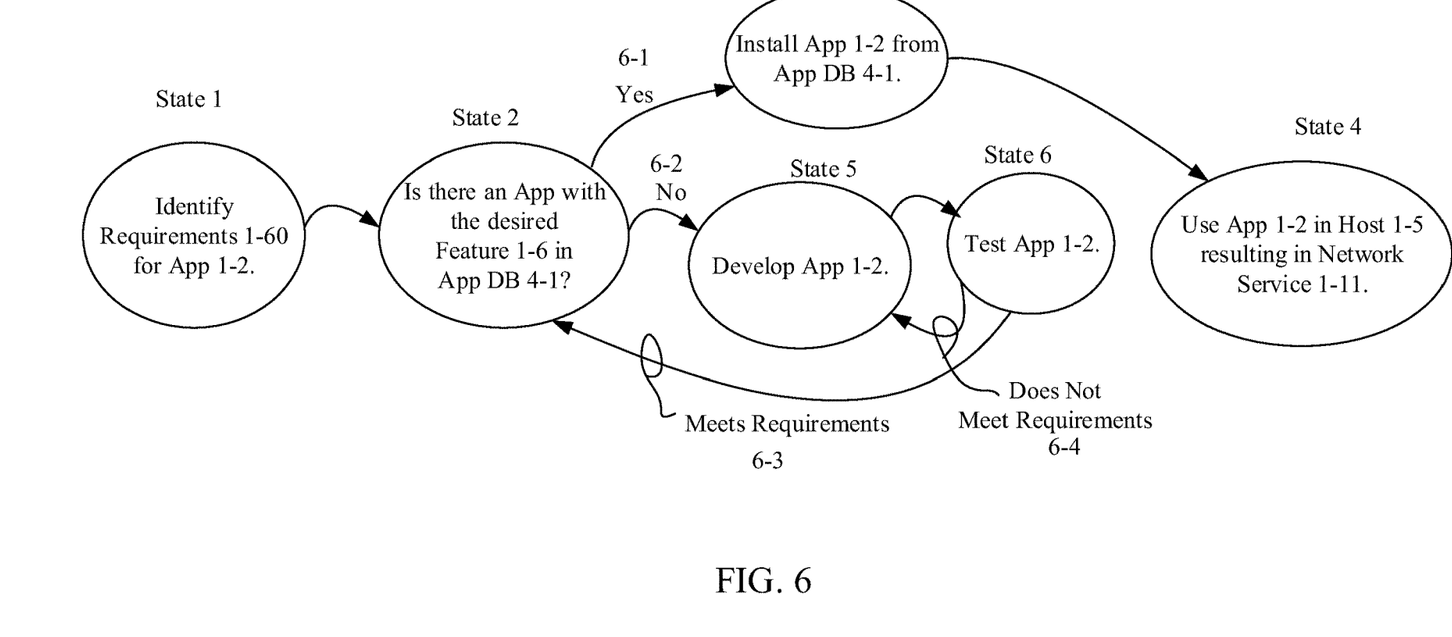
FIG. 6 is a state flow diagram corresponding to the logic flow of FIG. 2.

FIG. 6 is a state flow diagram corresponding to the logic flow of FIG. 2. At state 1, requirements 1-60 are identified for app 1-2. The requirements 1-60 may include interface protocols or API supported, run time to perform a task, acceptable error rate measure in performing the task, code size of the app 1-2, memory needed for the app 1-2 when executing, and delay of the app 1-2 in starting and ending the task. Also see FIG. 2 item 2-10.

At state 2, the smart library 1-1 attempts to identify the app 1-2 satisfying the requirements 1-60 and performing the feature 1-6. If there is no existing app, a request is sent to the software supplier 1-7 (see FIG. 6 item 6-2 "No", also see FIGS. 3A and 3B item 3-13), and the state changes from state 2 to state 5. At state 5, the app 1-2 is developed (also see FIG. 3 item 3-14). The state then changes to state 6 and the app 1-2 is tested (also see FIG. 3 item 3-16 FIG. 5 discussion of the test paradigm 5-4 and FIG. 10 item 10-13). If the app 1-2 fails the test (item 6-4) the state changes back to state 5 for debugging (development was not complete). If the app 1-2 passes the test, the state changes to state 2.

At state 2, if an app 1-2 is present with the desired feature, the state changes to state 3 (see 6-1 "yes"). At state 3, the app 1-2 is installed in the host 1-5 (also see FIG. 2 item 2-12, FIGS. 3A and 3B item 3-13, FIG. 4A Vend 4-21, and FIG. 10 item 10-93).

The state then changes from state 3 to state 4 and app 1-2 is used in the host 1-5 providing feature 1-6 and resulting in network service 1-11 (also see FIG. 1A and discussion of item 1-14).

Figure 7:
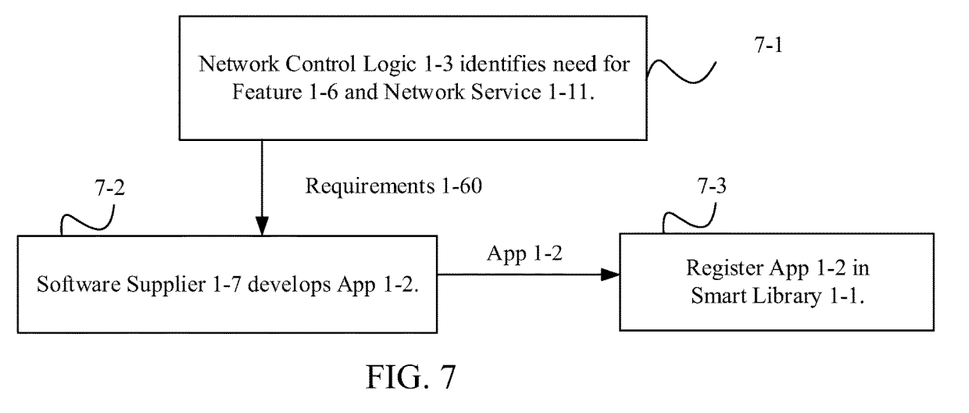
FIG. 7 is a logic flow for generating a software application, according to some embodiments.

FIG. 7 is a logic flow for generating a software application, according to some embodiments. At 7-1, the network control logic 1-3 identifies a need for the feature 1-6 to provide network service 1-11. At 7-2 of the logic flow, the network control logic 1-3 sends the requirements 1-60 to the software supplier 1-7, and the software supplier 1-7 develops the app 1-2. At 7-3, in some embodiments, the app 1-2 is received and registered in the smart library 1-1.

Figure 8:
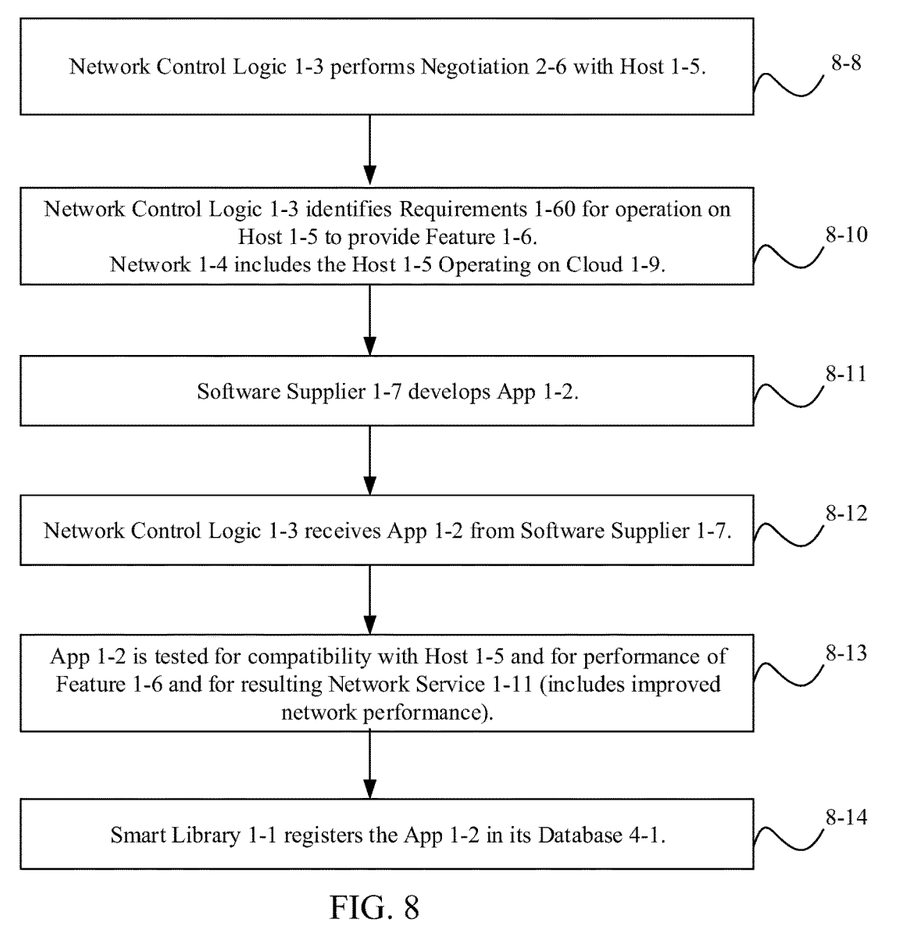
FIG. 8 provides additional logic to the logic flow of FIG. 7, according to some embodiments.

FIG. 8 provides additional logic to the logic flow of FIG. 7, according to some embodiments. At 8-8, the network logic 1-3 performs the negotiation 2-6 with the host 1-5. For further description of the negotiation 2-6, please see the discussion of FIG. 3A above. The negotiation 2-6 may be preceded by handshake 3-30 and establishment of the encrypted channel 3-32, as discussed with respect to FIG. 3A above.

At 8-10, the network control logic 1-3 identifies the requirements 1-60 for operation on host 1-5 to provide the feature 1-6.

At 8-11, the software supplier 1-7 develops the app 1-2. At 8-12, the network control logic 1-3 receives the app 1-2. At 8-13, the app 1-2 is tested for compatibility with the host 1-5 and for performance of feature 1-6. The delivery of network service 1-11 by the app 1-2 is also verified as providing improved network performance, in some embodiments. At 8-14, the smart library 1-1 registers the app 1-2 in the DB 4-1.

Figure 9:
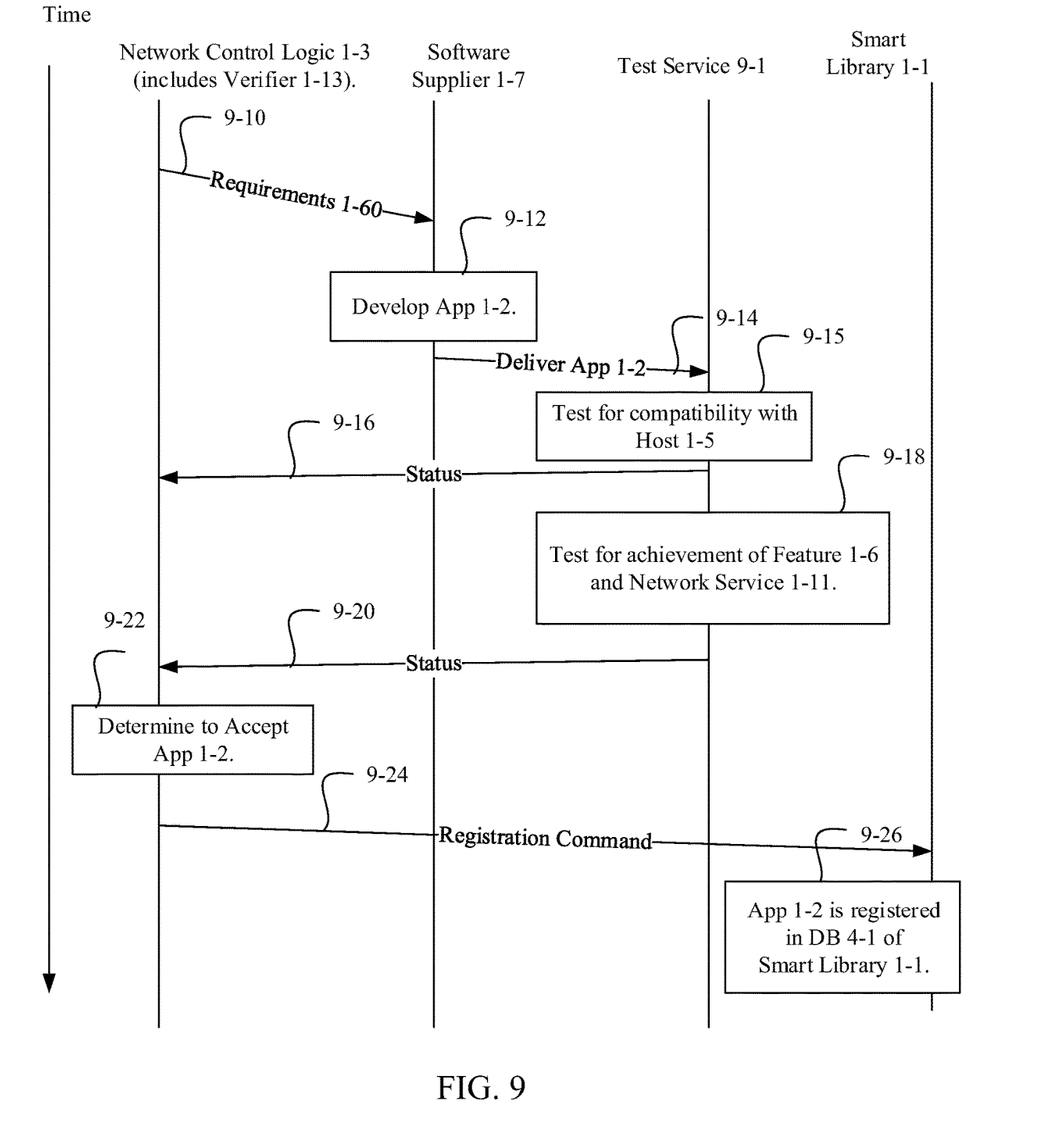
FIG. 9 is a message bounce diagram corresponding to the logic flow of FIG. 8, according to some embodiments.

FIG. 9 is a message bounce diagram corresponding to the logic flow of FIG. 8, according to some embodiments. A message 9-10 carries requirements 1-60 to the software supplier 1-7. The software supplier 1-7 develops the app 1-2 (see 9-12), and delivers the app 1-2 to a test service 9-1. The app 1-2 may be an applet. The test service 9-1 tests the app 1-2 for compatibility with the host 1-5 (see 9-15). Compatibility, in some embodiments, includes testing the app 1-2 for malware presence and for proper security practices. An example of a proper security practice is to not send sensitive information over a public network without encryption. A status or result of the compatibility test is sent as message 9-16 to the network control logic 1-3.

The test service 9-1 then tests the app 1-2 for achievement of feature 1-6 to provide network service 1-11. A status or result of the performance test is sent as message 9-20 to the network control logic 1-3.

The network logic 1-3 may reject the app 1-2 in view of status 9-16 and/or status 9-20 (rejection not shown in FIG. 9).

Based on the status 9-16 and/or the status 9-20, the network control logic 1-3 may determine that the app 1-2 is acceptable (see 9-22). The network control logic 1-3 may then send a registration command 9-24 to the smart library 1-1 causing the smart library 1-1 to register the app 1-2 in DB 4-1.

Figure 10:
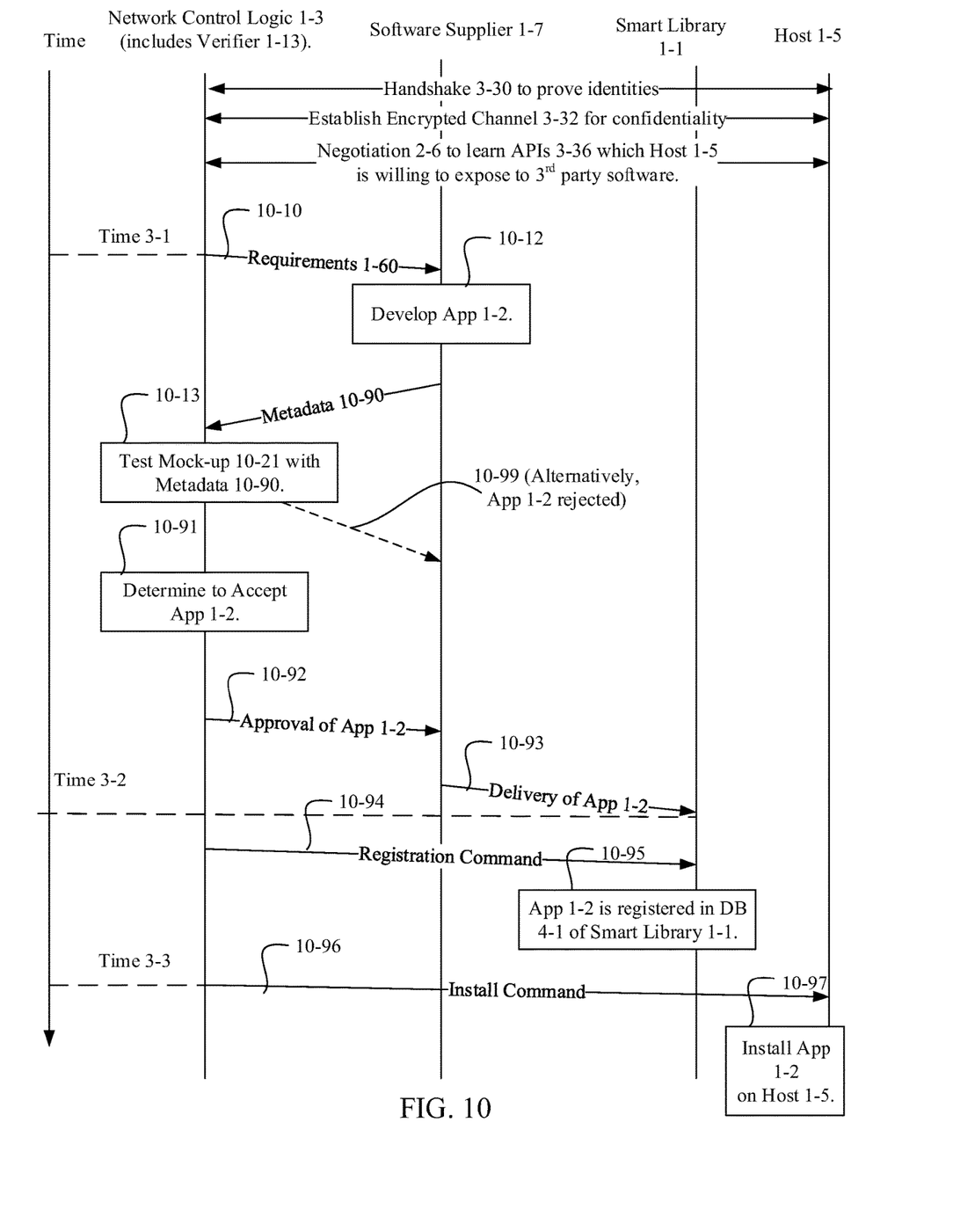
FIG. 10 is a message bounce diagram illustrating alternatives to FIGS. 3A, 3B and 9, according to some embodiments.

FIG. 10 is a message bounce diagram providing alternatives and/or variations of FIGS. 3A, 3B and 9, according to some embodiments.

FIG. 10 illustrates an embodiment including an ability to establish a test area, and verify if the application won't cause any harm to the network. For example, a developer of the app 1-2 defines the needed test arena. This definition is included with and/or in the app 1-2 when provided to the network control logic 1-3. Based on metadata included in the app 1-2, the application itself can identify an optimal test procedure. In some embodiments, a human is not needed to set up the test. Rather, the environment specified by the app 1-2 will take care of the test set up. Upon successful testing, the app 1-2 will be ready for push to production.

Thus, as illustrated in FIG. 10, a handshake 3-30 may be performed as in FIGS. 3A and 3B. Also an encrypted channel 3-32 may be established, and then a negotiation 2-6 performed (not shown). From the negotiation 2-6, the network control logic 1-3 recognizes that feature with requirements 1-60 would be permitted by the host 1-5.

At 10-10 (time 3-1), requirements 1-60 are sent to the software supplier 1-7. At 10-12, the software supplier 1-7 develops the app 1-2. The software supplier then characterizes the app 1-2 using metadata 10-90.

The metadata 10-90 may include codelets. As one of skill in the art knows, the codelets may include remote procedure calls. A remote procedure call (RPC) is when a computer program causes a procedure to execute in a different address space (commonly on another computer on a shared network), which is coded as if it were a normal (local) procedure call, without the programmer explicitly coding the details for the remote interaction. That is, the programmer writes essentially the same code whether the subroutine is local to the executing program, or remote. This is a form of client-server interaction (caller is client, executor is server), typically implemented via a request-response message-passing system.

The metadata 10-90 includes information identifying the specialized hardware equipment on which app 1-2 is configured to run, and the functional area applicable to the app 1-2, for example, "radio."

The network control logic determines, based on the metadata and the negotiation 2-6 whether one of the APIs 3-36 needed for the app 1-2 has been exposed by the host 1-5. If the metadata 10-90 has a conflict with the negotiation 2-6, the app 1-2 is rejected at 10-13 (see for example, 10-99 "rejected").

If the negotiation 2-6 permits the function of the app 1-2, the network control logic 1-3 performs a test of the app 1-2 on a mock-up 10-21 of the host 1-5. Actual generic hardware is configured, based on the metadata 10-90 to perform as the underlying machine of the host 1-5. Also see FIG. 5 item 5-4 and FIG. 11. The mock-up 10-21 is tested by running the metadata 10-90. The metadata 10-90 may contain codelets, executable on a remote (test) machine, and configured to provide network service 1-11 on the host 1-5.

In some instances the mock-up 10-21 identifies a problem or potential problem and rejects the app 1-2 (again see 10-99).

In some instances, the mock-up 10-21 determines that the app 1-2 is satisfactory for the host 1-5, and the network control logic 1-3 accepts the app 1-2 (see 10-91). There is a mutual trust relationship between the network control logic 1-3 and the software supplier 1-7, and the integrity of the metadata 10-90 in characterizing the app 1-2 is relied on by the network control logic 1-3.

A message is sent to the software supplier 1-7 accepting the app 1-2 (see 10-92).

In some embodiments, the software supplier 1-7 then delivers the app 1-2 to the smart library 1-1.

In some embodiments, the network control logic 1-3 may then send the smart library 1-1 a registration command (see 10-94). The smart library 1-1 then registers the app 1-2 (see 10-95) in the DB 4-1.

Finally an install command 10-96 may be sent to the host 1-5, and the app 1-2 installed in the host 1-5 (see 10-97) at time 3-3. The host 1-5 may fetch the app 1-2 from the smart library as shown in FIGS. 3A and 3B and 4A.

Figure 11:
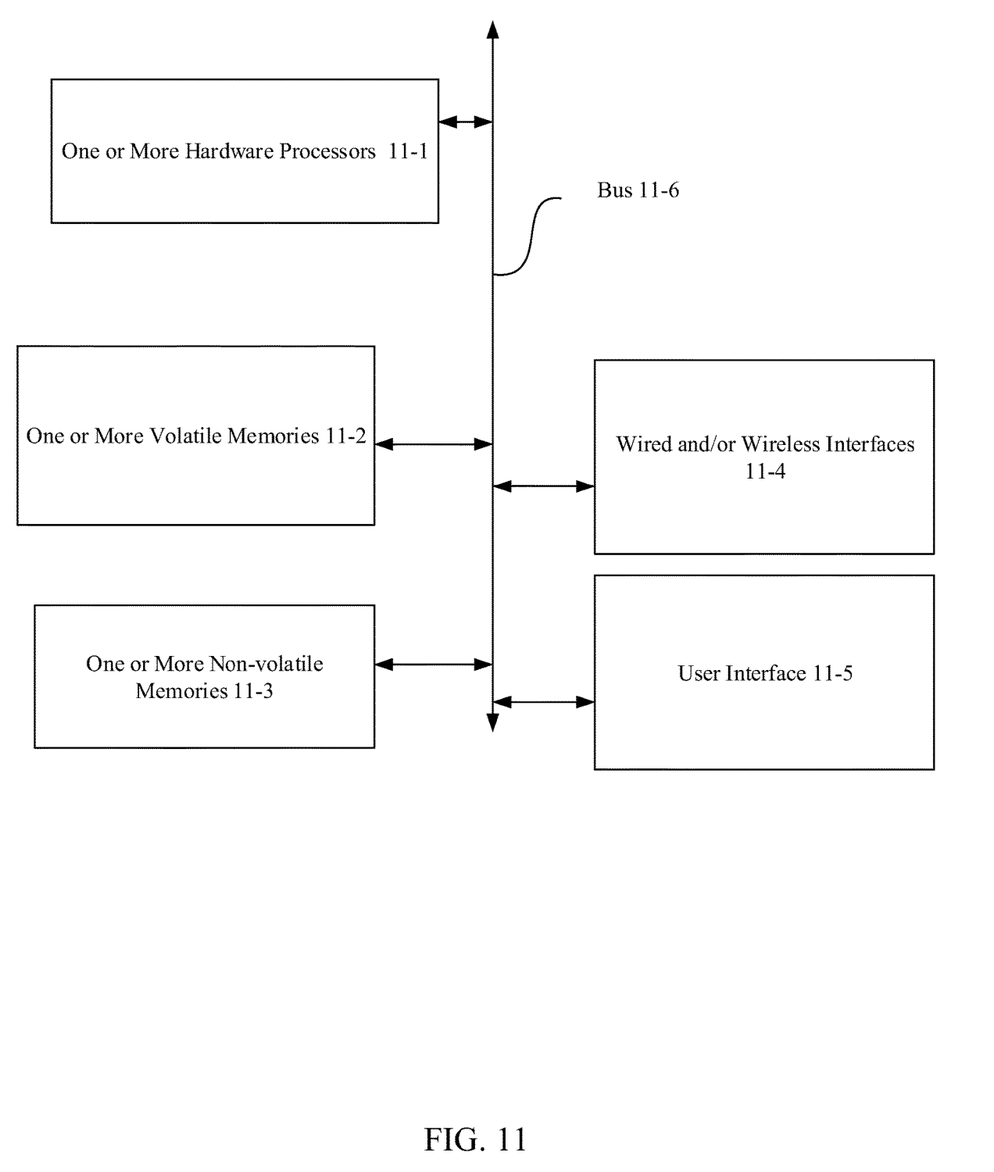
FIG. 11 illustrates an exemplary hardware and software configuration of any of the apparatuses described herein.

FIG. 11 illustrates an exemplary hardware and software configuration of any of the apparatuses described herein. One or more of the processing entities of FIG. 5 may be implemented using hardware and software similar to that shown in FIG. 11. FIG. 11 illustrates a bus 11-6 connecting one or more hardware processors 11-1, one or more memories 11-2, one or more non-volatile memories 11-3, wired and/or wireless interfaces 11-4 and user interface 11-5 (display screen, mouse, touch screen, keyboard, etc.). The non-volatile memories 11-3 may include a non-transitory computer readable medium.

The invention claimed is:

1. A method of managing a software application by a network control logic entity, the method comprising:
   obtaining an app; and
   running the app on a host server, wherein the host server is configured to provide services on a network,
   wherein the running the app provides a first network service,
   the host server is provided by an infrastructure vendor,
   the app is requested by the network control logic entity from a smart library server, and
   the smart library server is under a control of a mobile network operation operator (MNO), and the smart library server is configured to:
     receive requirements from the network control logic entity,
     send a request to a software supplier for development of the app,
     receive the app from the software supplier,
     receive a fetch command from the host server, and
     deliver the app to the host server.

2. The method of claim 1, wherein the app is to be configured perform a first feature not available in the network.

3. The method of claim 1, further comprising the network control logic entity commanding the host server to install the app in the host server.

4. The method of claim 3, wherein the app is configured to invoke cloud services via an application programming interface (API), wherein the cloud services and the API are supported by a cloud.

5. The method of claim 4, wherein a user makes use of the first network service provided by the host server executing the app.

6. A method of managing a software application by a network control logic entity, the method comprising:
   obtaining an app;
   commanding the host server to install the app in the host server; and
   running the app on a host server, wherein the host server is configured to provide services on a network,
   wherein the running the app provides a first network service,
   the host server is provided by an infrastructure vendor,
   the app is requested by the network control logic entity from a smart library server, and
   the smart library server is not under a control of the infrastructure vendor,
   wherein the app is configured to invoke cloud services via an application programming interface (API), wherein the cloud services and the API are supported by a cloud,
   wherein a user makes use of the first network service provided by the host server executing the app, wherein the first network service provides a log of phone calls made by the user or the first network service provides a reduction in electrical power consumption of the host server.

7. The method of claim 5, wherein the first network service provides a reduction in electrical power consumption of the host server.

8. The method of claim 1, wherein the obtaining further comprises:
   testing, by the network control logic entity, metadata on a mock-up of the host server, wherein the metadata corresponds to the app and characterizes the app, at least in part, in terms of codelets.

9. The method of claim 1, wherein the obtaining further comprises:
   determining by the smart library server, that the app is present in a smart library database (DB); and
   notifying the network control logic entity that the app is available in the DB.

10. The method of claim 9, wherein a first image of the app occupies a first memory region of a first server controlled by a software supplier, a second image of the app occupies a second memory region of the DB of the smart library server, and a third image of the app occupies a third memory region of the host server.

11. The method of claim 9, further comprising the network control logic entity commanding the host server to de-install the app from the host server and to save an app state in a fourth memory region of the DB, whereby the host server no longer provides the first network service.

12. An apparatus, the apparatus comprising:
   one or more processors;
   one or more memories; and
   computer code, wherein the computer code comprises:
     obtaining code configured to obtain an app; and
     executing code configured to cause the app to run on a host server,
   wherein:
     the host server is configured to provide services on a network,
     the app is configured to provide a first network service,
     the host server is provided by an infrastructure vendor,
     the app is requested by a network control logic entity from a smart library server, and
   the smart library server is under a control of a mobile network operator (MNO), and the smart library server is configured to:
     receive requirements from the network control logic entity,
     send a request to a software supplier for development of the app,
     receive the app from the software supplier,
     receive a fetch command from the host server, and
     deliver the app to the host server.

13. The apparatus of claim 12, wherein the app is to be configured perform a first feature not available in the network.

14. The apparatus of claim 12, wherein the computer code further comprises command code configured to cause the host server to install the app in the host server.

15. The apparatus of claim 12, wherein the app is configured to access cloud services via an application programming interface (API), wherein the cloud services and the API are supported by a cloud.

16. The apparatus of claim 12, wherein the first network service is configured to provide a log of phone calls made by a user.

17. The apparatus of claim 12, wherein the first network service is configured to provide a reduction in electrical power consumption of the host server.

18. The apparatus of claim 12, wherein the obtaining further comprises:
  testing, by network control logic, the app for compatibility with the host server and for adequate performance with respect to a set of requirements specified by the network control logic entity.

19. The apparatus of claim 18, wherein the obtaining further comprises:
  testing, by the network control logic, metadata on a mock-up of the host server, wherein the metadata corresponds to the app and characterizes the app, at least in part, in terms of codelets.

20. A non-transitory computer readable medium storing instructions, wherein the instructions are configured to cause computer to:
  obtain an app; and
  run the app on a host server, wherein the host server is configured to provide services on a network,
  wherein the app is configured to provide a first network service,
  the host server is provided by an infrastructure vendor,
  the app is requested by a network control logic entity from a smart library server, and
  the smart library server is under a control of a mobile network operator (MNO), and the smart library server is configured to:
    receive requirements from the network control logic entity,
    send a request to a software supplier for development of the app,
    receive the app from the software supplier,
    receive a fetch command from the host server, and
    deliver the app to the host server.

* * * * *